US007313567B1

(12) United States Patent
Leung (10) Patent No.: US 7,313,567 B1
(45) Date of Patent: Dec. 25, 2007

(54) SCHEMALESS XML PAYLOAD GENERATION

(75) Inventor: Yiu-Ming Leung, Kirkland, WA (US)

(73) Assignee: Microsoft Corporation, Redmond, WA (US)

( * ) Notice: Subject to any disclaimer, the term of this patent is extended or adjusted under 35 U.S.C. 154(b) by 544 days.

(21) Appl. No.: 10/773,946

(22) Filed: Feb. 6, 2004

(51) Int. Cl.
G06F 17/30 (2006.01)
(52) U.S. Cl. .................. 707/102; 707/1; 707/10; 715/501.1; 715/514
(58) Field of Classification Search ............ 707/1–10, 707/100–104.1, 200–206; 715/514–515, 715/853–855, 214–215, 501.1; 709/217–219
See application file for complete search history.

(56) References Cited

U.S. PATENT DOCUMENTS 6,636,845 B2 * 10/2003 Chau et al. .................. 707/1

OTHER PUBLICATIONS

Steven J. DeRose, XML Linking, 2000, ACM, 1-12.*
Ernesto Damiani et al., Towards Securing XML Web Services, ACM, 90-96.*
Ernesto Damiani et al., Towards Securing XML Web Services, 2002, ACM, 90-96.*
Chidlovskii, B., Using regular tree automata as XML schemas, May 22-24, 2000, IEEE, 89-98.*
Bernadette Farias Losio et al., conceptual modeling of XML schemas, Nov. 7-8, 2003, ACM, 102-105.*
"MPEG-7 binary format for XML data," by Niedermeier, U.; Heuer, J.; Hutter, A.; Stechele, W.; IEEE Computer Society, Los Angeles, CA, 2002.

"Enhancing Network Communication in NPSNET-V Virtual Environments Using XML-Described Dynamic Behavior (DBP) Protocols," (Master's Thesis), by Fisher, W.D., Naval Postgraduate School, Monterey, CA, Sep. 2001, 153 pgs.
"A Declarative Manipulation Mechanism for OODB and XML D having Cyclic Schema," by Kakeshita, T.; Murata, M.; 2003 IEEE Pacific Rim Conference on Communications Computers and Signal Processing (PACRIM 2003), (Cat. No. 03CH37490), vol. 2, pp. 688-691.
"Adding Valid Time to XPath," by Zhang, S.; Dyreson, C.E., Databases in Networked Information Systems, Second International Workshop, DNIS 2002. Proceedings (Lecture Notes in Computer Science vol. 2544), pp. 29-42.
"An MFC Wrapper for MSXML," by Campione, B.; Windows Developers Journal, vol. 12, No. 2, pp. 18-29, Feb. 2001.
"XTree for Declarative XML Querying," by Zhuo Chen; Tok Wang Ling; Mengchi Liu; Dobbie, Gillian; 9th International Conference on Database Systems for Advanced Applications, DASFAA 2004, Jeju Island, Korea, Mar. 17-19, 2004.
Completeness and Soundness of Declarative Tree Manipulation Mechanism, by Murata, M.; Kakeshita, T.; (IEIC Technical Report, Institute of Electronics, Information and Communication Engineers), 2002, vol. 102, No. 64 (DE2002 1-11), pp. 23-28.

(Continued)

*Primary Examiner*—Jean Bolte Fleurantin
(74) *Attorney, Agent, or Firm*—Merchant & Gould PC (57) ABSTRACT

An XML payload is generated from an XML list irrespective of a schema associated with the XML list. The parent/child relationship pats are collected from the field entries in the XML list. An XML payload node tree is created reflective of the parent/child relationship of data in the paths of the XML list. The XML payload can then be generated from the XML payload node tree and exported as needed to target software applications or web pages.

19 Claims, 6 Drawing Sheets

OTHER PUBLICATIONS

"Graph summarization for indexing paths in graph-structured data," Feb. 2004, by Kaushik, S.; vol. 64/08-B of Dissertation Abstracts International, p. 3905.

"Efficient Supporting XML Query and Keyword Search in Relational Database Systems," by Changzuan Wan; YungShen Liu, Advances in Web-Age Information Management, Third International Conference, WAIM 2002, Beijing, China, Aug. 11-13, 2002, pp. 1-12.

"AXIS: A XML Schema Integration System," by Sakamuri, B.; Madria, S.; Passi, K.; Chaudhry, E.; Mohania, M.; Bhowmick, S.; Conceptual Modeling—ER 2003. 22nd International Conference on Conceptual Modeling, Chicago, ILL, Oct. 13-16, 2003.

"New XML Standards Proposed," by Lawton, George; Computer, vol. 32, No. 5 (May 1999), pp. 20-21.

* cited by examiner

| | A | B | C | D | E |
|---|---|---|---|---|---|
| 1 | name | DepartmentID | name2 | PersonID | |
| 2 | Engineering | 1001 | John | 20001 | |
| 3 | Engineering | 1001 | Peter | 20002 | |
| 4 | Human Resource | 1002 | Corey | 20003 | |
| 5 | Human Resource | 1002 | Pat | 20004 | |
| 6 | | | | | |
| 7 | | | | | |
| 8 | | | | | |

FIG. 4
Exemplary Input Data

FIG. 5

```
<Corp>
    <Department name="Engineering">
        <DepartmentID>1001</DepartmentID>
        <Managers>
            <Person name="John">
                <PersonID>20001</PersonID>
            </Person>
            <Person name="Peter">
                <PersonID>20002</PersonID>
            </Person>
        </Managers>
    </Department>
    <Department name="Human Resource">
        <DepartmentID>1002</DepartmentID>
        <Managers>
            <Person name="Corey">
                <PersonID>20003</PersonID>
            </Person>
            <Person name="Pat">
                <PersonID>20004</PersonID>
            </Person>
        </Managers>
    </Department>
</Corp>
```

FIG. 6
XML Payload

SCHEMALESS XML PAYLOAD GENERATION

TECHNICAL FIELD

The invention relates generally to the field of XML payload generation. More particularly, the invention relates to generating a XML payload from an XML list without using the schema.

BACKGROUND OF THE INVENTION

An XML list of multi-dimensional data is usually associated with a schema to assist in defining the data. However processing a schema and an XML data file to create a XML payload for export to a software application or a web page is very computational intensive. A large amount of computer processing power is consumed in applying the schema to the XML data file. It is very desirable to be able to receive imported XML data or enter XML data, then optionally modify XML data and finally export the data without use a schema during import, modification and export.

It is with respect to these considerations and others that the present invention has been made.

SUMMARY OF THE INVENTION

In accordance with the present invention, a method is provided for generating an XML payload from an XML list irrespective of a schema associated with the XML list. This is accomplished by collecting the paths from the field entries in the XML list and creating an XML payload node tree reflective of the relationship of data in the paths of the XML list. The XML payload can then be generated from the XML payload node tree and exported as needed to target applications or web pages.

In another aspect of the invention, the creation of the XML payload node tree is accomplished by first grouping the paths indicative of parent/child relationships of data according to path length. An XML payload node tree is created reflective of the parent/child relationship of data in the paths of the XML list. Then for each record in the XML list, the shortest parent path is traversed starting with a primary parent or root node. The traversal determines if nodes for the shortest parent path have been created in the payload node tree. If nodes are missing along this shortest parent path in the node tree, nodes are created for the missing node along this path, and a pointer is set to identify the end node in the node tree, i.e. the end of a branch, from which longer paths for the record might extend. If there is a longer path for the same record in the XML list, the above node creating operation and pointer setting operation are repeated starting with the end node, extending the branch with new nodes to a new end node until the longest path for the same record has been processed and a branch in the XML payload node tree for the record has been completed. Then the above operations are repeated for the next record in the XML list until a complete node tree has been built for all the records in the XML list.

The invention may be implemented as a computer process, a computing system or as an article of manufacture such as a computer program product or computer readable media. The computer readable media may be a computer storage media readable by a computer system and encoding a computer program of instructions for executing a computer process. The computer program readable media may also be a propagated signal on a carrier readable by a computing system and encoding a computer program of instructions for executing a computer process.

These and various other features as well as advantages, which characterize the present invention, will be apparent from a reading of the following detailed description and a review of the associated drawings.

DETAILED DESCRIPTION OF THE INVENTION

The logical operations of the various embodiments of the present invention are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations making up the embodiments of the present invention described herein are referred to variously as operations, structural devices, acts or modules. It will be recognized by one skilled in the art that these operations, structural devices, acts and modules may be implemented in software, in firmware, in special purpose digital logic, and any combination thereof without deviating from the spirit and scope of the present invention as recited within the claims attached hereto.

Figure 1:
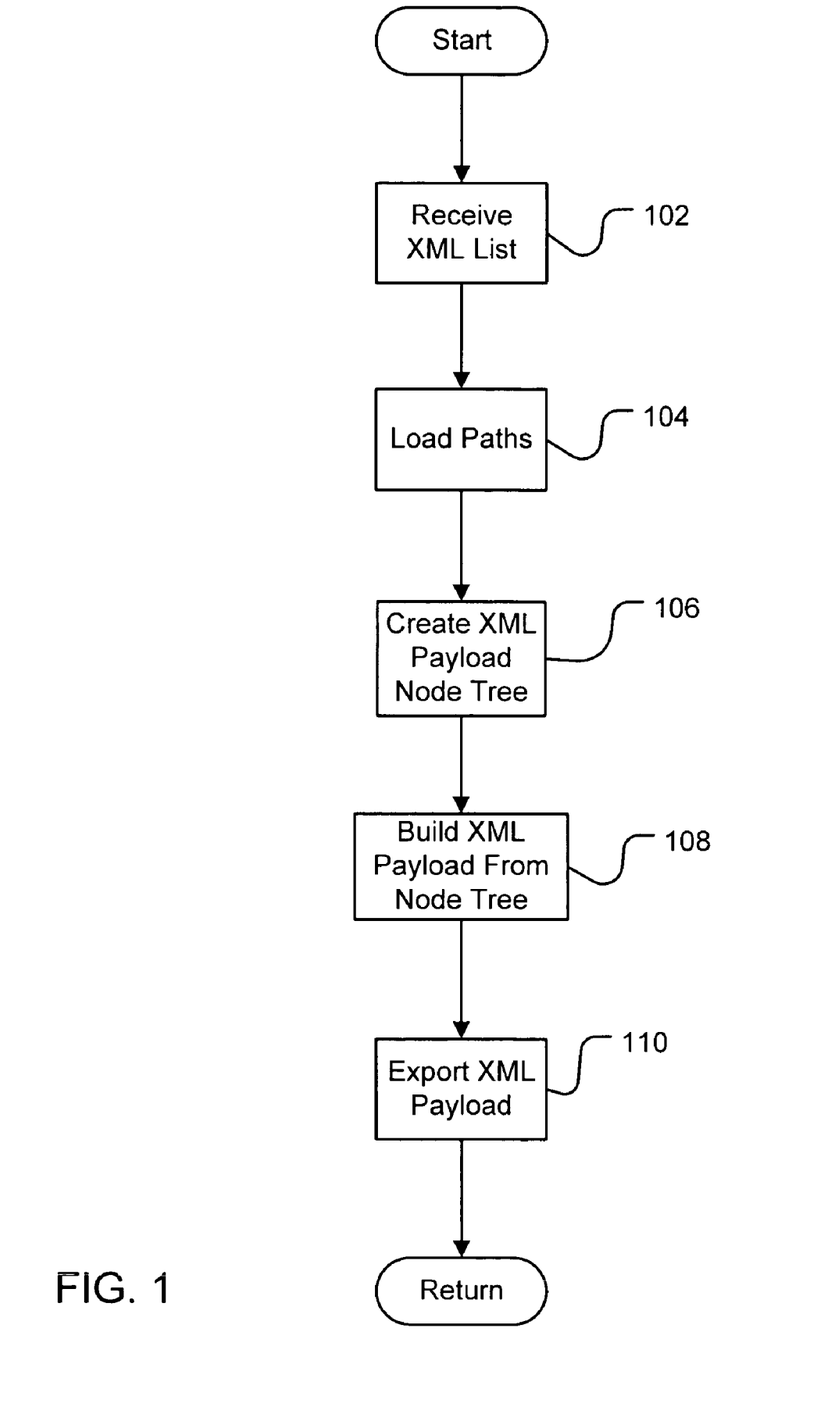
FIG. 1 illustrates one embodiment of the invention in which XML list is received, an XML payload node tree is created and an XML payload is built from the node tree and exported.

FIG. 1 illustrates one embodiment of the invention for processing an XML list to create an XML payload. Receive operation 102, receives the XML list for processing. An XML list might be input by the user or it might be imported from a software application or as a part of a web page component. Although XML lists can be extended to represent data in multi-dimensional format, currently they are being used in a two dimensional form in the form of rectangular regions, or tables, typically in a spreadsheet application. Each definition of XML list describes how the table should look like and how cells inside relate to the payload data.

A collection of these XML lists can be found inside an XMLSS file. An exemplary format for a XML list definition in an XMLSS file is shown immediately below in Table 1.

<Entry x2:ID="List1">
<Range>'Employee Lookup'!R5C1</Range>
<XPath>/Corp/Department</XPath>

```
<Field>
   <XSDType>string</XSDType>
   <XPath>@name</XPath>
</Field>
<Field>
   <XSDType>string</XSDType>
   <XPath>DepartmentID</XPath>
</Field>
<Field>
   <XSDType>string</XSDType>
   <XPath>Managers/Person@name</XPath>
</Field>
<Field>
   <XSDType>string</XSDType>
   <XPath>Managers/Person/PersonID</XPath>
</Field>
</Entry>
```
Table 1

Each XML list begins with an <Entry . . . > XML tag and ends with the an </Entry> XML tag. Cells inside the XML list (or table) are arranged in the form of records. A record corresponds to a row in the table. Columns inside the table are called fields, they are defined in the XML list by each <Field> and </Field> tags. Thus, the exemplary XML list in Table 1 defines four columnar fields in each row of the table. Further, the XML list has XPaths on a line in each field that begin with the <XPath> tag and end with the </XPath> tag. The XPaths indicate the parent/child relationship of each field in a record and will be used in the present embodiment of the invention to create an XML payload node tree.

The preferred embodiment of the invention generates an XML payload from a XML List. It does so using only the paths, i.e. XPATHs, specified in the XML list and without processing the schema of the payload. The operations may be summarized as follows:

1. When the XML list is loaded, all the Field XPATHs are examined and their corresponding Parent XPATHs are generated. A Parent XPATH is the XPATH to the parent of a particular Field XPATH assuming that it represents a property in both element and attribute centric cases. For example, for an attribute Field XPATH,/a/b/@c, it's Parent XPATH is /a/b. For an element Field XPATH, /a/b/c, it's Parent XPATH /a/b.
2. The Parent XPATH with the most number of "steps" is then chosen to be the Bottom XPATH. If there is more than one, the first one is chosen.
3. All the other Parent XPATH should either be a subset or equal to the Bottom XPATH. For example, /a, /a/b are subset of /a/b/c. If this is not the case, we have a nested table case and the load will be aborted. Those Fields with Parent XPATHs with a fewer number of steps than the Bottom XPATH are called "fill-downs".
4. All the Parent XPATHs are grouped together according to the number of steps that they have.
5. The algorithm starts with the Parent XPATH that has the least number of steps. Note that in the case where there are no fill-downs, this is also the Bottom XPATH.
6. Starting with the first row in the XML List
7. Initialize an empty result node set
8. Starting from the Parent XPATH with the least number of steps, the XPATH is traversed from the node contained in the result set, if any. If the node is missing while traversing the XPATH, a new node is created along the path. At the end node, the values of all the Fields using this Parent XPATH are used to locate the node. If there is no node with all those values at the attribute/element properties, a new node is created and the values from the Fields are put into their appropriate attribute/element properties. If there are more than one end nodes with all the matching properties, the first one is chosen.
9. The result node set is cleared and that particular end node is then inserted into it.
10. If there are more Parent XPATHs, go back to step 8 to process the next Parent XPATH.
11. If there are more rows in the XML List, go back to step 7 to process the next row.

In FIG. 1, load module 104 collects all the XPaths in an XML list per the first three steps above so that they may be processed by create module 106. Node tree create module 106 takes the parent/child relationship information from the XPaths and starting with the shortest XPath in a record and working through to the longest XPath in the same record builds a branch of the XML payload node tree. Once all records in an XML list have been processed by node tree create module 106, a complete payload node tree for the XML list will have been created. The node tree create module will be described in more detail hereinafter with reference to FIG. 3.

Figure 6:
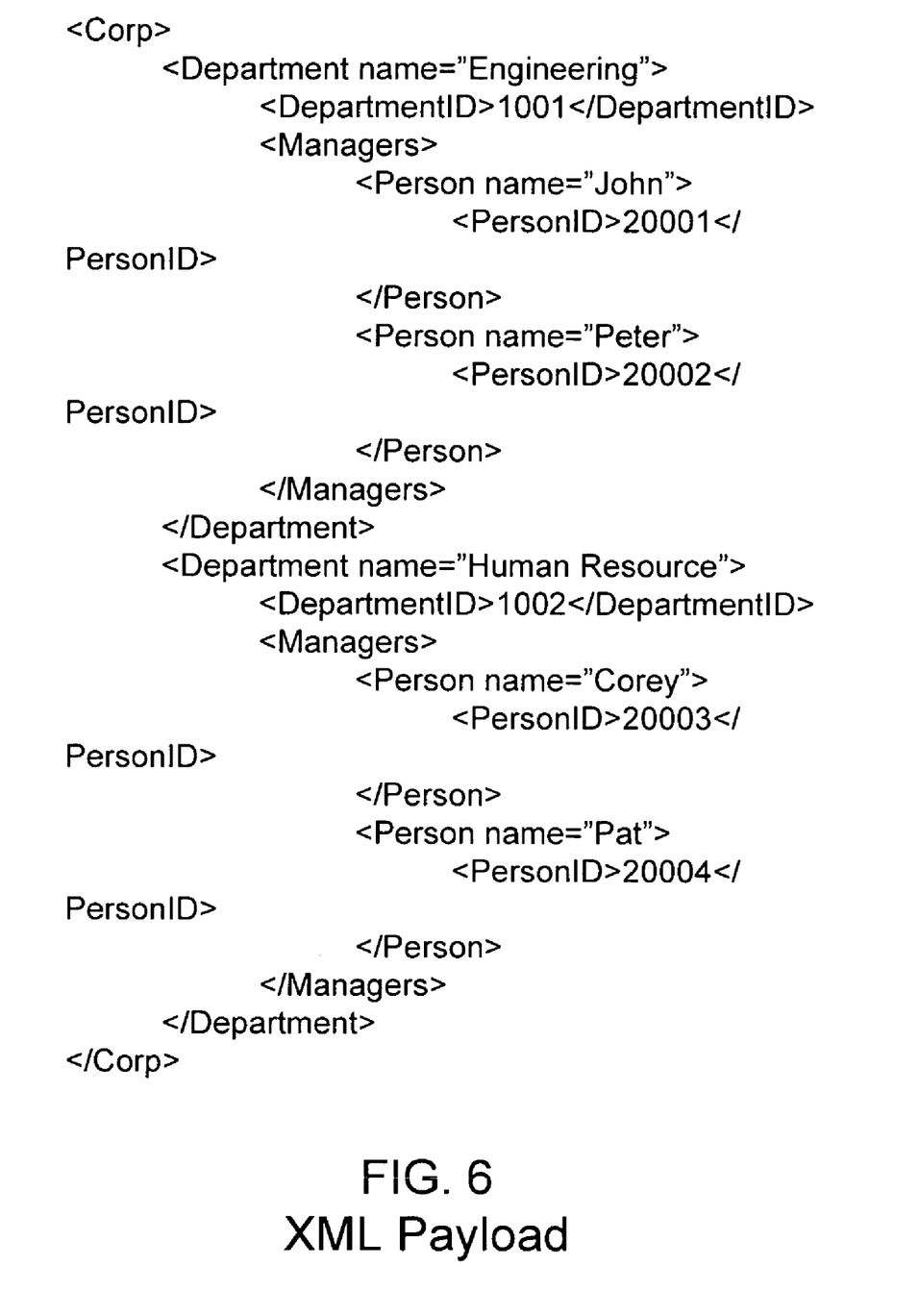
FIG. 6 shows an exemplary XML payload built from the node tree of FIG. 5 and ready for export to a software application.

Once an XML payload node tree has been created and stored, it may be retrieved or read by the build module 108. Build module 108 will convert the XML payload node tree into an XML payload list (one example is shown in FIG. 6) for export to a software application or as a web component in a web page. Export module 110 performs the acts to export the XML payload list.

Figure 2:
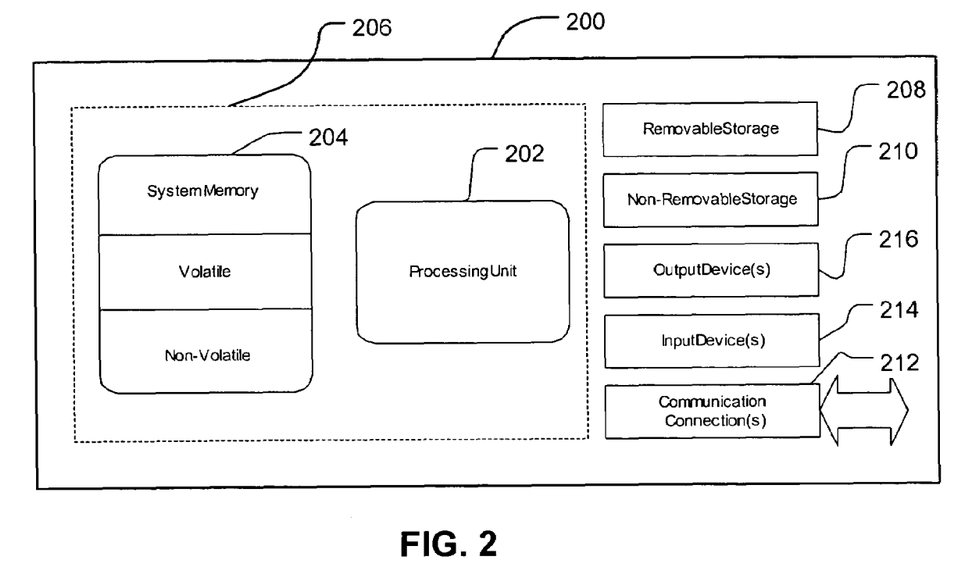
FIG. 2 illustrates an example of a suitable computing system environment on which embodiments of the invention may be implemented.

FIG. 2 illustrates an example of a suitable computing system environment on which embodiments of the invention may be implemented. In its most basic configuration, system 200 includes at least one processing unit 202 and memory 204. Depending on the exact configuration and type of computing device, memory 204 may be volatile (such as RAM), non-volatile (such as ROM, flash memory, etc.) or some combination of the two. This most basic configuration is illustrated in FIG. 2 by dashed line 206.

In addition to the memory 204, the system may include at least one other form of computer-readable media. Computer readable media can be any available media that can be accessed by the system 200. By way of example, and not limitation, computer-readable media might comprise computer storage media and communication media.

Computer storage media includes volatile and nonvolatile, removable and non-removable media implemented in any method or technology for storage of information such as computer readable instructions, data structures, program modules or other data. Memory 204, removable storage 208 and non-removable storage 210 are all examples of computer storage media. Computer storage media includes, but is not limited to, RAM, ROM, EPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by system 200. Any such computer storage media may be part of system 200.

System 200 may also contain a communications connection(s) 212 that allow the system to communicate with other devices. The communications connection(s) 212 is an example of communication media. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

In accordance with an embodiment, the system 200 includes peripheral devices, such as input device(s) 214 and/or output device(s) 216. Exemplary input devices 214 include, without limitation, keyboards, computer mice, pens, or styluses, voice input devices, tactile input devices and the like. Exemplary output device(s) 216 include, without limitation, displays, speakers, and printers. Each of these "peripheral devices" are well know in the art and, therefore, not described in detail herein.

Figure 3:
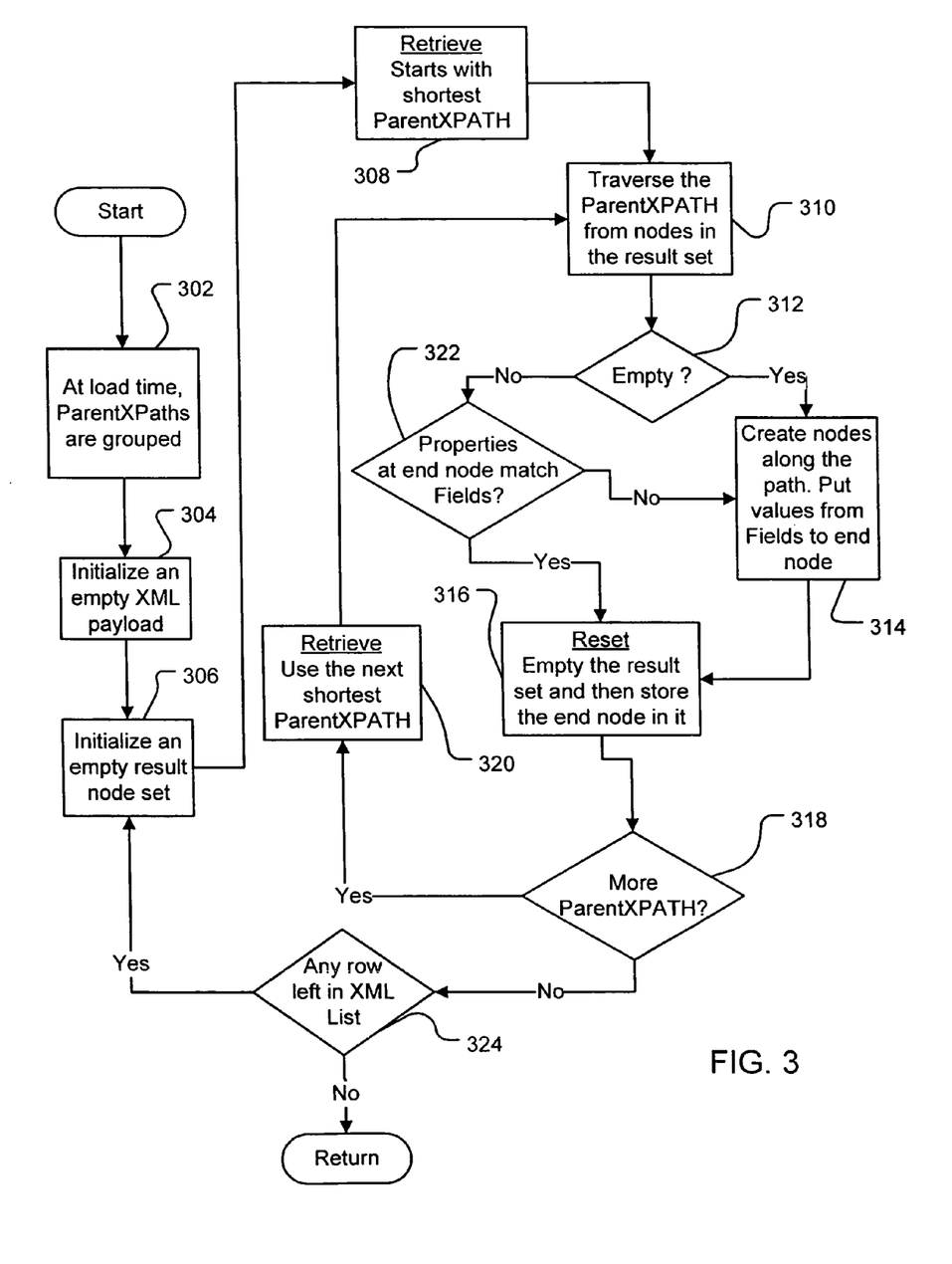
FIG. 3 illustrates the operational flow of the operations performed in creating an XML payload node tree.
Figure 4:
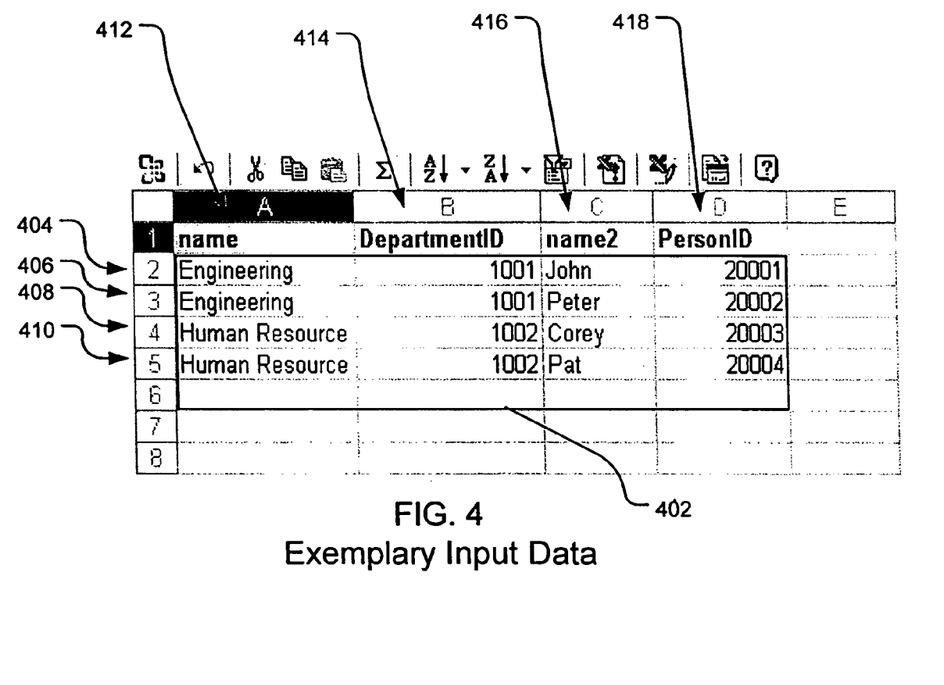
FIG. 4 shows some exemplary input data for a spreadsheet that may be received as an XML list and processed by the operations of FIG. 1 to generate an XML payload for export.
Figure 5:
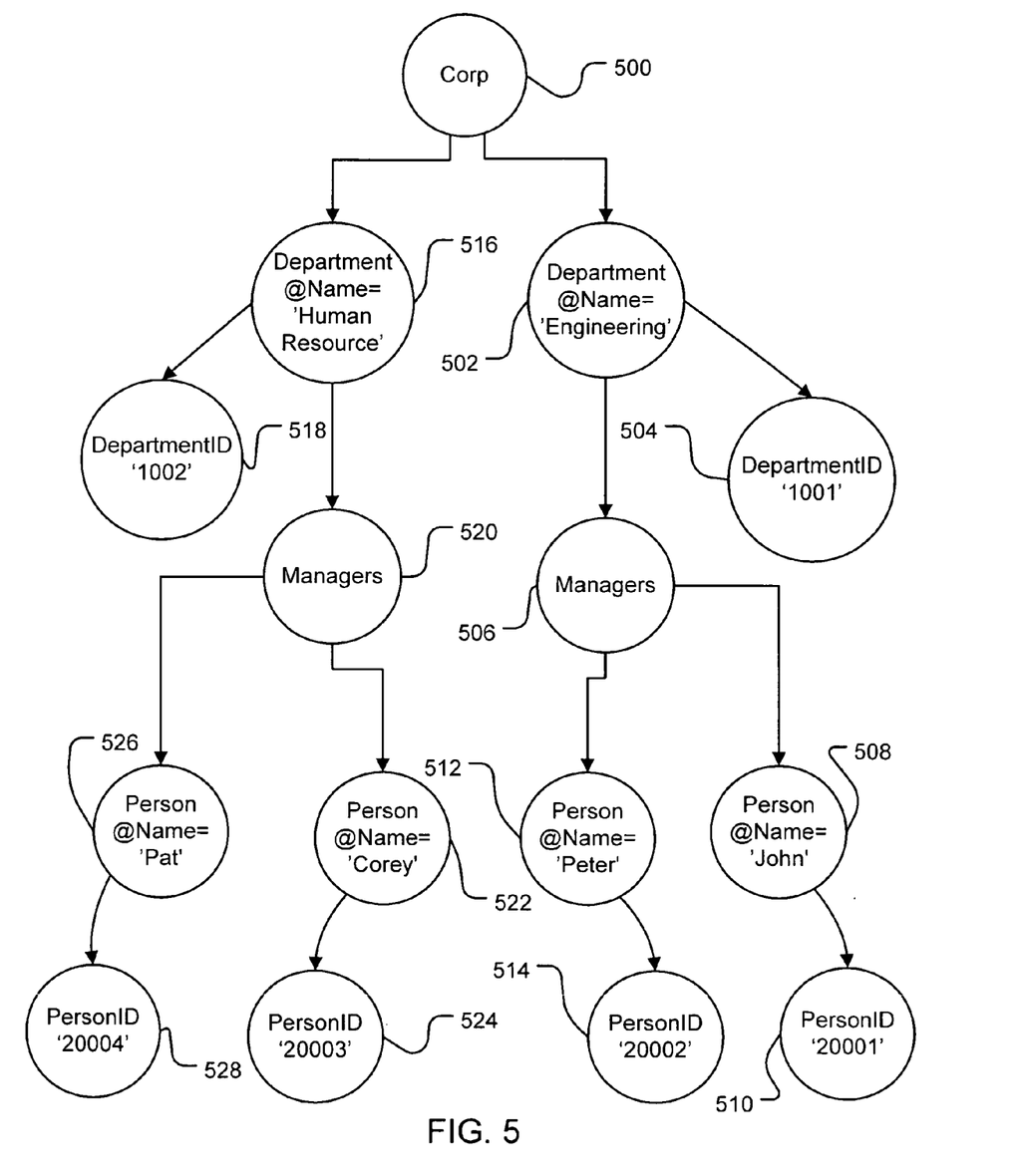
FIG. 5 shows an exemplary XML payload node tree created from the input data of FIG. 4.

In FIG. 3 the operational flow for creating an XML payload node tree begins when group operation 302 groups the parent XPaths in the XML list. This operational flow is best understood by describing the operations of FIG. 3 with reference to exemplary input data shown in FIG. 4 and with reference to a resulting XML payload node tree as shown in FIG. 5. In FIG. 4, the input data 402 contains four rows, or records, 404, 406, 408, 410 and four columns, or fields, 412, 414, 416, 418. The XML list will appear in format shown and discussed above with reference to TABLE 1.

Group operation 302 examines each Field XPaths and groups them according to the path length, which is the number of steps it contains, not number of characters in the path. Steps in an XPath are separated by the '/' character. For the XML list, XPaths by Field would be grouped as follows.

/Corp/Department

/Corp/Department/Managers/Person.

In this example, "Corp" is the primary or root node, and the shortest XPath for the record is /Corp/Department.

In FIG. 3 payload initialize operation 304 assigns and empties or clears a storage space for the XML payload node tree. Likewise result node set initialize operation 306 assigns and empties or clears a storage space to store an end node pointer for the current end node in each branch of the node tree as a branch for each record is being created in the node tree. With the storage space for the node tree initialized and cleared, and with the end node pointer initialized and cleared, retrieve operation 308 starts the creation of the node tree by retrieving the shortest parent XPath. In the example, the shortest parent XPath is /Corp/Department.

Traverse operation 310 using the Parent XPath as a guide traverses nodes in the XML node tree from the end point node. Thus, the traverse operation determines if the nodes in the XPath are in the XML node tree in node tree storage. Since this is the first parent XPath traversed, the end point node is the root node, Corp. The traverse operation finds that the nodes, Corp and Department, have not been created and stored in node tree storage space. Empty test operation 312 detects that these nodes are not in XML payload node tree storage, and the operation flow branches YES to node create operation 314.

Node create operation 314 creates and stores a node for each node, Corp and Department in the shortest parent XPath. Further, node create operation stores for each node its parent/child link or relationship. The property values of "Engineering" and "1001" for the Department are also missing from the node tree. Therefore, create operation 314 stores in the Department node all of its attribute properties, i.e. name=Engineering, and creates all of its element property nodes, i.e. DepartmentID, storing their values, i.e. 1001, with a value node linked back to the Department node. Value nodes only contain values and are not an end node from which longer branches of the same record might extend. Thus, in the example XML payload node tree in FIG. 5, node create operation 314 (FIG. 3) has created the Corp node 500, the Department element node 502 with the name "Engineering" and the Department ID value node 504 with value 1001. Node 502 is an element node from which further children may relate and is in fact the new end node. Node 504 is a value node and stores the value for the Department ID.

After the nodes for the shortest XPath have been created and stored as a portion of the XML payload node tree, pointer reset operation 316 empties or clears the current pointer for the record, i.e. default pointer pointing to root node Corp, and stores a new end node pointer pointing to the Department node 502. More parent XPaths test operation 318 then detects whether there are more parent XPaths to be traversed and added to the branch of the node tree for this record. In the present example, there are more and longer parent XPaths, and the operation flow branches YES to retrieve operation 320 to retrieve next shortest parent XPath. The next shortest parent XPath is /Corp/Department/Managers/Person, and this XPath is provided to traverse operation 310.

Traverse operation 310 determines that the nodes, Corp and Department, are in the payload node tree and further that Department node is pointed to by the pointer in the result node set as the end node from the previous path. Traverse operation also determines that the nodes, Managers and Person, are not in the node tree, and further finds that the values "John" and 20001 are the properties for the Person node. Since Managers node is not in the XML payload node tree, empty test operation 312 branches the operation flow YES to node create operation 314.

Node create operation 314 now creates a node for Managers and a node for Person. Further, the create operation stores the parent/child relationship or link for the Mangers node and the Person node. The Managers node 506 links up to the Department node 502, and the Person node 508 links up to the Managers node 506. Also the attribute, John, is stored with the Person node by node create operation 314, and a value node 510 for Person ID is created that links to the Person node and stores the value 20001. Reset operation 316 now empties the result node set and stores a pointer to point to a new end node which is the Person node 508. There are no more parent XPaths in the XML list. Accordingly, operation flow branches NO from more parent XPaths test 318 to XML row test operation 324. This completes the branch of the XML payload node tree for record 404. Since there are more rows or records in the XML list, the operation flow branches YES to initialize a result node set for the next record to empty. The next record to be processed is row 406. Some properties are different as the Person name is Peter and the PersonID is 20002. Note that another row or record could be processed next rather than row 406 as the sequence of processing the rows is not important. The same XML payload node tree as shown in FIG. 5 will result irrespective of the sequence of processing the XML list for the rows 404, 406, 408, 410 in FIG. 4.

Retrieve operation 308 now starts with the shortest parent XPath which is /Corp/Department. Traverse operation 310 traverses this path from the root node Corp and determines that the nodes Corp and Department are already in the XML payload node tree. Accordingly, the operation flow branches NO from the empty test operation 312 to properties test operation 322. Properties test operation 322 detects whether the properties in the existing end node, which is Department node 502 (FIG. 5), match the properties at the end node, which is also a department node, of the XPath being traversed. In this example the properties at the existing end node, which is Department node 502, are Engineering and 1001, and the properties for Department at the end of the shortest Parent XPath for the new record are also Engineering and 1001. Accordingly, there is a match, and the operation flow branches YES to reset operation 316. Reset operation 316 empties the node result set for record 406 and sets a new pointer pointing to Department node 502.

More parent XPaths test operation 318 detects that there is another parent XPath to be processed for record 406 and the operation flow branches YES to retrieve operation 320. Retrieve operation 320 retrieves the next shortest parent XPath which is /Corp/Department/Managers/Person. Traverse operation traverses s this path and finds that there are already nodes for Corp, Department with Name=Engineering, Managers and Person in the XML payload node tree. The empty test operation 312 therefore branches the operation flow to properties test operation 322. Properties test operation 322 detects whether the properties in the existing end node, which is Person node 508 (FIG. 5), match the properties at the Person end node of the XPath being traversed. Since the XPath being traversed has an end node Person with the properties, name=Peter and a Person ID of 20002, the properties do not match. The operation flow branches NO from properties test 322 to node create operation 314.

Node create operation 314 now creates another Person node 512 linked to Managers node 506 and having as an attribute, name=Peter. Further, node create operation creates a PersonID node 514 linked to Person node 512. PersonID node 514 is a value node containing the value 20002 as the PersonID for Peter, who is named in Person node 512. After the Person node and the PersonID node are created, reset operation 316 resets the pointer in the result node set to point to the Person node 512. More parent XPaths test operation 318 tests for more XPaths for the record 406. Since there are no more XPaths for record 406, the processing of record 406 is complete. The operation flow branches NO from test operation 318 and YES from row test operation 324 to begin the generation of a branch in the XML payload node tree for the next record such as row 408 (FIG. 4).

The next record is row 408. Some properties are different in the shortest path as the Department name is Human Resources and the DepartmentID is 1002. Retrieve operation 308 now retrieves the shortest parent XPath. Traverse operation 310 traverses this path from the root node Corp and determines that the nodes Corp and Department are already in the XML payload node tree. Accordingly, the operation flow branches NO from the empty test operation 312 to properties test operation 322. Properties test operation 322 detects that the properties in the existing end node, which is Department node 502 (FIG. 5), do not match the properties at the end node, which is also a department node, of the XPath being traversed. In this example the properties at the existing end node, which is Department node 502, are Engineering and 1001, and the properties for Department at the end of the shortest Parent XPath for the new record are Human Resource and 1002. Accordingly, the operation flow branches NO to node create operation 314.

Node create operation 314 creates new Department node 516 (FIG. 5) with a parent/child relationship linked to the Corp node 500. Further, the attribute Name=Human Resource is stored with the Department node 516. In addition node create operation creates a Department ID node 518 linked to the Department node 516 and storing the value 1002. Reset operation 316 empties the node result set for record 408 and sets a new pointer pointing to Department node 516.

More parent XPaths test operation 318 detects that there is another parent XPath to be processed for record 408, and the operation flow branches YES to retrieve operation 320. Retrieve operation 320 retrieves the next shortest parent XPath which is /Corp/Department/Managers/Person. Traverse operation starts with Department node 516 pointed to by pointer in the end node result set and traverses this path to find that there are no nodes for Managers and Person linked to Department node 516 in the XML payload node tree. The empty test operation 312 detects the absence of the Managers and Person node and branches the flow YES to node create operation 314.

Node create operation 314 now creates a new node for Managers and a new node for Person. Further, the create operation stores the parent/child relationships or links for the Mangers node and the Person node. The Managers node 520 links up to the Department node 516, and the Person node 522 links up to the Managers node 520. Also the attribute, Corey, is stored with the Person node by node create operation 314, and a value node 524 for Person ID is created that links to the Person node and stores the value 20003. Reset operation 316 now empties the result node set and stores a pointer to point to a new end node which is the Person node 522. There are no more parent paths in the record or row 404 (FIG. 4). Accordingly, operation flow branches NO from more parent XPaths test 318 to XML row test operation 324. This completes the branch of the XML payload node tree for record 408. Since there is one more row or record in the example in FIG. 4, the operation flow branches YES to initialize a result node set for the last record which is row 410.

Retrieve operation 308 now retrieves the shortest parent XPath for record 410 which is /Corp/Department. Traverse operation 310 traverses this path from the root node Corp and determines that the nodes Corp and Department with Name=Human Resource are already in the XML payload node tree. Accordingly, the operation flow branches NO from the empty test operation 312 to properties test operation 322. Properties test operation 322 detects whether the properties in the existing end node, which is Department node 516 (FIG. 5), match the properties at the end node, which is also a department node, of the XPath being traversed. In this example the properties at the existing end node, which is Department node 516, are Human Resource and 1002, and the properties for Department at the end of the shortest Parent XPath for the new record are also Human Resource and 1002. Accordingly, there is a match, and the operation flow branches YES to reset operation 316. Reset operation 316 empties the node result set for record 406 and sets a new pointer pointing to Department node 516.

More parent XPaths test operation 318 detects that there is another parent XPath to be processed for record 410, and the operation flow branches YES to retrieve operation 320. Retrieve operation 320 retrieves the next shortest parent XPath which is /Corp/Department/Managers/Person. Traverse operation traverses this path from the end node 516 pointed to by the pointer in the result node set and finds that there are already nodes for Managers and Person in the XML payload node tree linked from Department node 516. Further, the traverse operation finds that the Person end node in the path being traversed has the properties, Name=Pat and PersonID 20004. The empty test operation 312 therefore branches the operation flow to properties test operation 322. Properties test operation 322 detects whether the properties in the existing end node, which is Person node 522 (FIG. 5), match the properties at the Person end node of the XPath being traversed. Since the existing Person node 522 has the properties, name=Corey and a Person ID of 20003, the properties do not match. The operation flow branches NO from properties test 322 to node create operation 314.

Node create operation 314 now creates another Person node 526 linked to Managers node 520 and having as an attribute, name=Pat. Further, node create operation creates a PersonID node 528 linked to Person node 526. PersonID node 528 is a value node containing the value 20004 as the PersonID for Pat, who is named in Person node 526. After the Person node and the PersonID node are created, reset operation 316 resets the pointer in the result node set to point to the Person node 526. More parent XPaths test operation 318 tests for more XPaths for the record 410. Since there are no more XPaths, the processing of record 410 is complete, and the operation flow branches NO from test operation 318 to row test operation 324. Since row or record 410 is the last record of the present example of an XML list, the generation of the XML payload node tree is complete, and the operation flow returns to the main program flow.

When the system is called upon to export the XML payload, the build operation 108 (FIG. 1) will build the XML payload as shown in FIG. 6 from the XML payload node tree shown in FIG. 5. Export operation 110 will then export the XML payload to a software application or to a web page as a web component.

The various embodiments described above are provided by way of illustration only and should not be construed to limit the invention. Those skilled in the art will readily recognize various modifications and changes that may be made to the present invention without following the example embodiments and applications illustrated and described herein, and without departing from the true spirit and scope of the present invention, which is set forth in the following claims.

What is claimed is:

1. In a computer system, a method for generating an XML payload from an XML list and independent of a schema associated with the XML list, the method comprising:
    grouping paths indicative of parent/child relationships of data for each record in the XML list according to the path length;
    traversing a path, of the grouped paths, in an XML payload node tree;
    creating one or more nodes in the XML payload node tree to extend a branch from a current end node to a new end node, if the act of traversing the path does not find a node in the branch for each parent/child relationship in the path;
    omitting the step of creating if the act of traversing the path does find a node in the branch for each parent/child relationship in the path;
    if the act of traversing does find all nodes in the branch to a current end node in the branch, property testing to detect whether the properties of the current end node in the branch match the properties of an end node in the path being traversed;
    if the properties of the current end node in the path do not match the properties of the end node in the path being traversed, the act of creating also includes creating new nodes for the nodes having different properties to extend the branch to a new end node from the current end node;
    if the properties of the current end node in the path do match the properties of the end node of the path being traversed, the act of creating does not include creating new nodes for the nodes having matching properties; and
    generating the XML payload from the XML payload node tree.

2. The method of claim 1 further comprising:
    performing a pointer reset operation whereby a pointer pointing to the current end node points to the new end node whereby the new end node becomes the current end node.

3. The method of claim 2 further comprising:
    testing for more paths in the record; and
    and if there are more paths, repeating the act of traversing with a next path and repeating the act of creating for the next path in the record.

4. The method of claim 1 further comprising:
    performing a pointer reset operation whereby a pointer pointing to the current end node points to the new end node whereby the new end node becomes the current end node;
    testing for more paths in the record; and
    and if there are more paths, repeating the acts of traversing, creating, and property testing for the next path in the record.

5. The computer system of claim 1, wherein the XML list is an XML spread sheet (XMLSS).

6. The computer system of claim 1, wherein the traversing the path further comprises traversing the shortest path of the group of paths that have not been previously traversed.

7. An XML payload generating system in a computing system for generating a schemaless XML payload from an XML list, the XML payload generating system comprising:
    a load module for collecting all the parent/child paths in the XML list; and
    a node tree create module for creating an XML payload node tree from the XML list based on the parent/child paths in the XML list;
    said node tree create module using a parent/child path as a guide and traversing a path in the XML payload node tree being created and adding a node in the node tree for each parent/child relationship in the path that does not have a node in the node tree and not adding a node in the node tree when each parent/child relationship in the path does have a node in the node tree;
    said node tree create module testing whether the properties of a current end node in the node tree match the properties of an end node in the path being traversed;
    if the properties of the current end node in the path do not match the properties of the end node in the path being traversed, said node tree module creating new nodes for the nodes having different properties to extend the node tree to a new end node from the current end node;
    if the properties of the current end node in the path do match the properties of the end node in the path being traversed, said node tree module does not create new nodes for the nodes having matching properties; and
    a build module for building the XML payload from the XML payload node tree.

8. The system of claim 7 further comprising:
    said node tree create module resetting a pointer pointing to the current end node to pointing to the new end node, whereby the next path being traversed against the node tree will be traversed starting with respect to the new end node.

9. The system of claim 7 further comprising:
an export module for exporting the XML payload to a software application.

10. The system of claim 7 further comprising:
an export module for exporting the XML payload as a web component to a web page.

11. The XML payload generating system of claim 7, wherein the XML list is an XML spread sheet (XMLSS).

12. The system of claim 7 wherein the path traversed by the node tree create module is the shortest path not previously traversed.

13. A computer readable medium for storing computer instructions for a computer process for generating an XML payload from an XML list for multi-dimensional data independent of the schema of the data, the computer process comprising:
grouping all of the paths in a record of the XML list according to their parent/child relationships;
traversing the parent/child relationship of the current shortest path in the record;
creating nodes in a node tree representative of the parent/child relationship if nodes for parent child relationships in the current shortest path are missing;
omitting the step of creating nodes in the node tree if nodes for parent/child relationships in the current shortest path are found;
repeating the above acts until all paths for the record have associated nodes in the branch of the node tree for the record;
if nodes do exist for parent child relationships in the current shortest path, testing properties of a current end node in a branch of the node tree against properties of end node in the path being traversed to detect whether the properties match;
if the properties do not match, creating nodes in a node tree representative of the parent/child relationship for the nodes having properties that do not match the nodes in the node tree;
if the properties do match, not creating nodes in the node tree representative of the parent/child relationship for the nodes having properties that do match the nodes in the node tree; and
building the XML payload from the node tree.

14. The computer readable medium of claim 13 wherein the computer process further comprises:
testing whether there is another record in the XML list; and
if there is said another record, repeating all the acts of claim 13 for said another record.

15. The computer readable medium of claim 13 wherein the computer process further comprises:
performing a pointer reset operation whereby a pointer pointing to the current end node points to the new end node whereby the new end node becomes the current end node for the next path of the record being traversed.

16. The computer readable medium of claim 15, wherein the computer process further comprises:
testing for more records in the XML list; and
if there are said more records, repeating the acts of claim 15 to create a branch in the node tree for each of said more records.

17. The computer readable medium of claim 13, wherein the computer process further comprises:
exporting the XML payload as a web component to a web page.

18. The computer readable medium of claim 13, wherein the XML list is an XML spread sheet (XMLSS).

19. The computer readable medium of claim 13, wherein the computer process further comprises:
exporting the XML payload to a software application.

* * * * *